United States Patent [19]
Kaneko

[11] Patent Number: 6,081,630
[45] Date of Patent: Jun. 27, 2000

[54] SCANNER SYSTEM

[75] Inventor: Koji Kaneko, Omiya, Japan

[73] Assignee: Fuji Photo Co., Ltd., Saitama, Japan

[21] Appl. No.: 09/031,675

[22] Filed: Feb. 27, 1998

[30] Foreign Application Priority Data

Feb. 28, 1997 [JP] Japan ................................. 9-045707

[51] Int. Cl.$^7$ ............................. G06K 9/22; H04N 1/024
[52] U.S. Cl. ................................. 382/313; 358/473
[58] Field of Search ................................. 382/313, 312, 382/314, 317, 319, 320; 358/473, 472, 404, 444, 442, 468

[56] References Cited

U.S. PATENT DOCUMENTS

| | | | |
|---|---|---|---|
| Re. 33,425 | 11/1990 | Nihei ........................................ | 358/473 |
| 4,912,561 | 3/1990 | Honda ........................................ | 358/473 |
| 4,922,111 | 5/1990 | Kuwano et al. ........................... | 382/313 |
| 5,012,349 | 4/1991 | De Fay ...................................... | 382/313 |
| 5,335,090 | 8/1994 | Yamada et al. .......................... | 382/313 |
| 5,431,389 | 7/1995 | Wensink et al. ......................... | 358/473 |
| 5,644,410 | 7/1997 | Suzuki et al. ............................ | 382/313 |
| 5,656,804 | 8/1997 | Barkan et al. ............................ | 382/313 |
| 5,739,923 | 4/1998 | Kawatiara ................................. | 358/473 |
| 5,748,339 | 5/1998 | Suzuki et al. ............................ | 358/473 |
| 5,933,550 | 8/1999 | Fujieda et al. ........................... | 382/314 |

FOREIGN PATENT DOCUMENTS

63-181563  7/1998  Japan .

*Primary Examiner*—Madeleine Nguyen

[57] ABSTRACT

The light source unit (lid), which is substantially a right triangle, is supported to be freely rotatable via the hinge at the bottom of the main body casing. The light source for illumination and the assist roller are arranged in the light source unit. When operating the scanner system, the scanning window is opened by rotating the light source unit. When not operating, the scanning window is closed by rotating the light source unit to the right bottom of the main body casing, and the scanning face is protected. Moreover, the magnets are used to lock and hold the light source unit in the opening state or the closing state. The main power source is turned on when the opening state of the lid is detected by the Hall sensor or the reed switch, and the scanner system becomes operatable.

36 Claims, 6 Drawing Sheets

SCANNER SYSTEM

BACKGROUND OF THE INVENTION

1. Field of the Invention

The present invention relates generally to a scanner system, and more particularly to a small-sized portable scanner system which collects image information when the script surface is scanned by hand.

2. Description of Related Art

In a hand-held scanner which collects image information while moving over the script as it illuminates the script by a light source for illumination, the light reflected on the script surface which enters from a scanning window (slit) is conducted to a line sensor (CCD) via a lens. The small-sized scanner of that type can be put in a pocket and carried, so there has been a problem in that the script scanning window easily became dusty and it got scratches. A conventional protection cover which can be put on and taken off was provided to avoid dusts and scratches.

However, the on/off type protection cover has a disadvantage in that the cover must be taken off every time before using the scanner, and then it must be put back after using the scanner, making the operation inefficient and inconvenient.

On the other hand, if the protection cover is not provided, scratches and dusts stick on the surface of the scanning window of the scanner, and they become the causes of the streaks and blurs by becoming scanner signals. Besides, the poor sliding or operation of the roller during scanning occurs when dusts and foreign materials stick on the main roller which detects (sub scan detection) the moving distance over the script, and causes image compression or image distortion in the sub scan direction.

SUMMARY OF THE INVENTION

The present invention has been developed in view of the above-described circumstances, and has as its object the provision of a small-sized scanner system which eliminates the problem of taking on and off the protection cover and prevents dusts and scratches to stick while not operating the scanner system, and which is also portable.

In order to achieve the above-described objects, the scanner system which moves over a script surface while illuminating a script surface by a light source for illumination, and scans the image information on the script surface by conducting the light reflected on the script surface to an image sensor, wherein: a scanning face in which a scanning window, collecting the light reflected on the script surface, is constructed to be able to open/close by a lid which is hinged to the main body of the scanner system, and at least one of the light source for illumination, a roller which contacts and rotates on the script surface, and a projection which contacts and slides on the script surface, is arranged on the lid.

According to the present invention, the scanning face in which the scanning window, collecting the light reflected on the script surface, is formed, is constructed to be able to open/close by the lid. The scanning face is protected by closing the lid while the scanner system is not being operated, and is exposed by opening the lid while scanning an image. Therefore, taking on/off of the protection cover, an inconvenient operation, can be eliminated. Further also the scanning window can avoid dusts and scratches.

Moreover, at least one of the light source for illumination, the roller which contacts and rotates on the script surface, and the projection which contacts and slides on the script surface, is arranged on the lid; thus the scanner system can be small-sized and also portable.

The form of the side of the lid is constructed to be substantially a right triangle, and the whole main body of the scanner system is constructed to face the diagonal line of the lid to the script surface when using the. The main body of the scanner system is used by tilting it. Thereby, the scanner system can be easily operated, and also the whole form of the scanner system when the lid is in the closing state can be substantially a rectangle which is suitable to carry.

Further, the lid can be held in the closing state or opening state with a simple structure, by utilizing a magnet for holding the lock in the closing or opening state of the lid. In addition, the lid is detected to be the opening or closing state utilizing the magnetic detection sensor, and the main power source is on/off in response to the state; thus the operation of the scanner system improves.

Furthermore, the insertion entrance of the memory card which stores the scanned image information is forcibly closed when the lid is in the open-locked state; and the insertion/pulling-out of the memory card is possible only when the lid is in the close-locked state or the scanner system is not being operated with the power source being off. Therefore, there is an advantage in that an erroneous operation such as pulling out the memory card when the scanner system is being operated can be prevented.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder the preferred embodiments of the scanner system, related to the present invention, are described in detail according to the accompanying figures.

Figure 1:
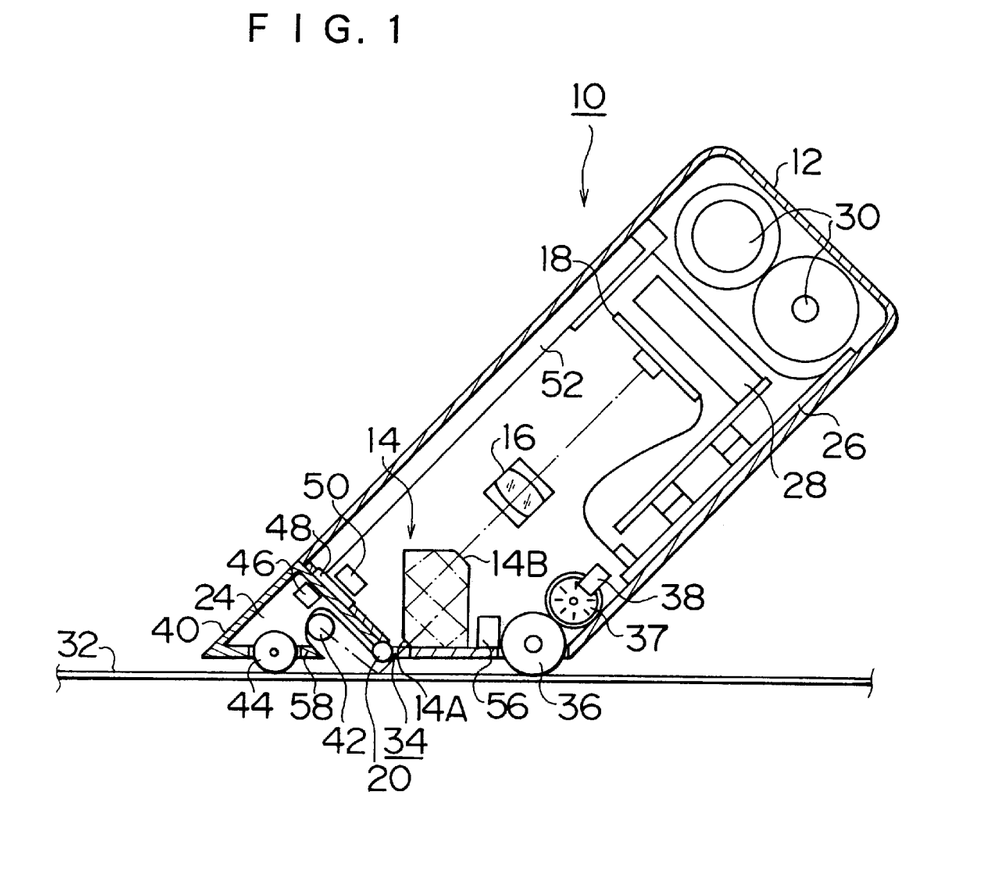
FIG. 1 is a side-sectional view of a scanner system which shows the embodiment of the scanner system related to the present invention and shows the scanner system which is being used (operated)
Figure 2:
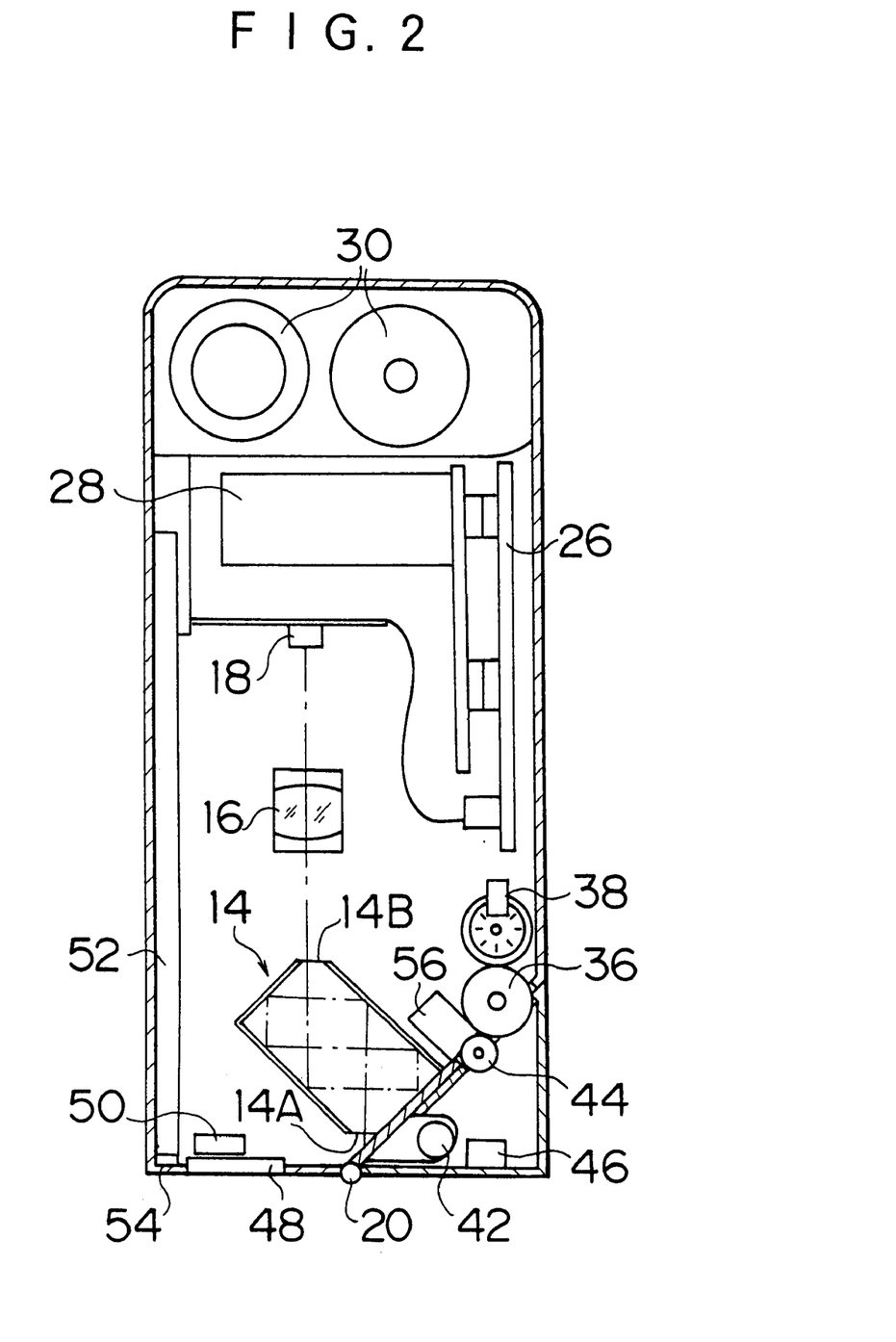
FIG. 2 is a side-sectional view which shows the scanner system in FIG. 1 not being operated.

FIG. 1 and FIG. 2 are side-sectional views of a small-sized hand-held scanner system to which the present invention is applied. FIG. 1 shows the state in which the scanner system is being used (operating state); FIG. 2 shows the state in which the scanner system is not being used (unoperated state).

A scanner system 10 consists of a prism block 14, a lens 16, a CCD image sensor 18, and so on, which are arranged in a main body casing 12, and a light source unit 24 (a lid) which section is in a shape like a triangle which is supported at the bottom of the main casing 12 to rotate freely via a hinge 20.

A circuit board 26, a DC—DC converter 28, a battery 30 as the power source are provided in the main body casing 12 other than the prism block 14 etc., and a scanning window (a slit) 34 which collects the image light reflected on a script 32 is formed at the position which is the bottom of the casing 12 and which is also the right side of the hinge 20.

Moreover, a main roller 36 is provided to the position which is the right of the prism block 14 and is also the bottom of the scanner system 10. The main roller 36 is provided with an encoder 37 which rotates in connection with the main roller 36, and a rotation detection sensor 38 which detects the number of rotation of the encoder 37. The position and distance which the scanner system 10 has moved over the script 32 surface can be detected by the rotation detection sensor 38.

On the other hand, the light source unit 24 consists of a light source 42 for illumination, an assist roller 44 for moving, and a magnet 46 for a lock which are all provided in a lid casing 40 which section is substantially a right triangle.

As shown in FIG. 1, when the scanner is being used, the light source unit 24 is rotated to the left bottom of the main body casing 12, and is magnetically adhered by the magnet 46 and a steel plate piece 48 which is provided in the main body casing 12, then the light source 24 is locked and held (open-locked state). Thus, the script reading surface (the scanning face), facing the script 32 surface, is opened, and the scanning face is faced to the script 32 surface by tilting the main body casing 12 by 45°.

In addition, the top of the steel plate piece 48 of the main body casing 12 is provided with a Hall sensor or a reed switch 50 to detect magnetism, so that whether the light source unit 24 is opened and locked by the magnet 46 can be detected. The Hall sensor or the reed switch functions as a main power source switch. In short, the main power source turns on when it is detected that the light source unit 24 is opened and held to be open-locked state by the magnet 46.

The prism block 14 is made of a transparent optical plastic or glass, and its section is formed to be substantially a rectangle. In other words, the prism block 14 has a pair of parallel reflective planes with the length A to be the bottom and the top surfaces of the prism block 14 in FIG. 1, and a pair of reflective planes with the length B (>A) to be the left and the right surfaces of the prism block 14. The prism block 14 is fixed to the main body casing 12 via a support member (not shown) so that the bottom reflective plane of the prism block 14 is parallel with respect to the script surface when the scanner system is being used.

A plane (incident plane) 14A with 45° inclination angle with respect to the script 32 surface is formed at the left bottom corner, that is, near the corner where the bottom reflective plane and the left reflective plane intersect each other. The incident main light of the light reflected on the script 32 surface enters perpendicularly to the incident plane 14A.

Same as above, a plane (out going) surface 14B, parallel to the incident plane 14A, is formed at the right top corner of the prism 14. That is, it is formed near the corner where the top reflective plane and the right reflective plane intersect each other. In addition, the incident plane 14A and the out going plane 14B are formed in a size not to disturb reflections of the top, bottom, left, and right reflective planes.

The width of the incident plane 14A is formed to be narrower than the width of the out going plane 14B so that the width of the incident plane 14A prevents the light from entering from a diagonal direction with respect to the incident plane 14A. However, if the width of the incident plane 14A is extremely narrow, the necessary amount of light is also prevented from entering because the light is reflected and diffused by the top of the corner. Thus the width of the incident plane 14A secures the necessary amount of light which is to enter and at the same time prevents unnecessary light from entering.

On the other hand, regarding the width of the out going plane 14B, if the width of the out going plane 14B is too narrow, the amount of light in the sagital direction is small and the resolution will be lowered; thus the width of the surface of the out going plane 14B needs to be determined in so that it will be able to obtain sufficient amount of light in the sagital direction.

The script 32 surface is illuminated by the light source 42, and the light reflected on the script 32 surface enters into the main body casing 12 via the scanning window 34. After the light enters into the prism block 14 from the incident plane 14, it then enters into the first reflective plane at the right by 45°. It then is reflected on the first reflective plane in the upper left diagonal direction in FIG. 1, and thereafter reflected on the second reflective plane at the top in the lower left diagonal direction in FIG. 1. Then it is reflected on the third reflective plane at the left in the lower right diagonal direction, and reflected on the first reflective plane in the left bottom diagonal direction in FIG. 1. Finally, it is reflected on the fourth reflective plane at the bottom in the upper left diagonal direction, and lastly exits out of the prism block 14 from the out going plane 14B via the third reflective plane.

The lens 16 and the CCD image sensor 18 are provided in the 45° upper right diagonal direction of the prism block 14. The light from the prism block 14 is conducted to the CCD image sensor 18 via the lens 16. The light, entering into the receiving surface of the CCD image sensor 18, is converted to an electric signal according to the intensity of the light, and the electric signal is conducted to the scanner circuit 26. Then, the information of the script image is obtained by the image signal processing means of the scanner circuit 26.

In a case that the scanner system is not being used, the light source unit 24 is rotated counterclockwise in FIG. 1 and is contained at the right bottom of the main body casing 12 as shown in FIG. 2. Then scanning window 34 is closed.

A magnet 56 for a lock is provided between the prism block 14 and the main roller 36, and a steel plate piece 58 is provided on the surface where an assist roller 44 at the side of the light source unit 24 is provided. Thus as shown in FIG. 2, when the light source unit 24 is rotated to the right bottom of the main body casing 12, the light source unit 24 is magnetically adhered by the magnet 56 and the steel plate piece 58 of the light source unit 24, and the light source unit 24 is locked and held (close-locked state).

A housing of a memory card 52 is formed along the left wall of the main body casing 12. A card insertion entrance 54 is formed at the left bottom surface of the main body casing 12. Thus, when the light source unit 24 is at the position in FIG. 1, the card insertion entrance 54 is closed by the light source unit 24, so the memory card 52 can not be inserted or pulled out. Then, when the light source unit 24 is at the position in FIG. 2, the memory card 52 can be inserted or pulled out from the bottom in FIG. 2.

By the above-described structure, a faulty operation such as ejecting the memory card by mistake during using the scanner can be prevented.

Figure 3:
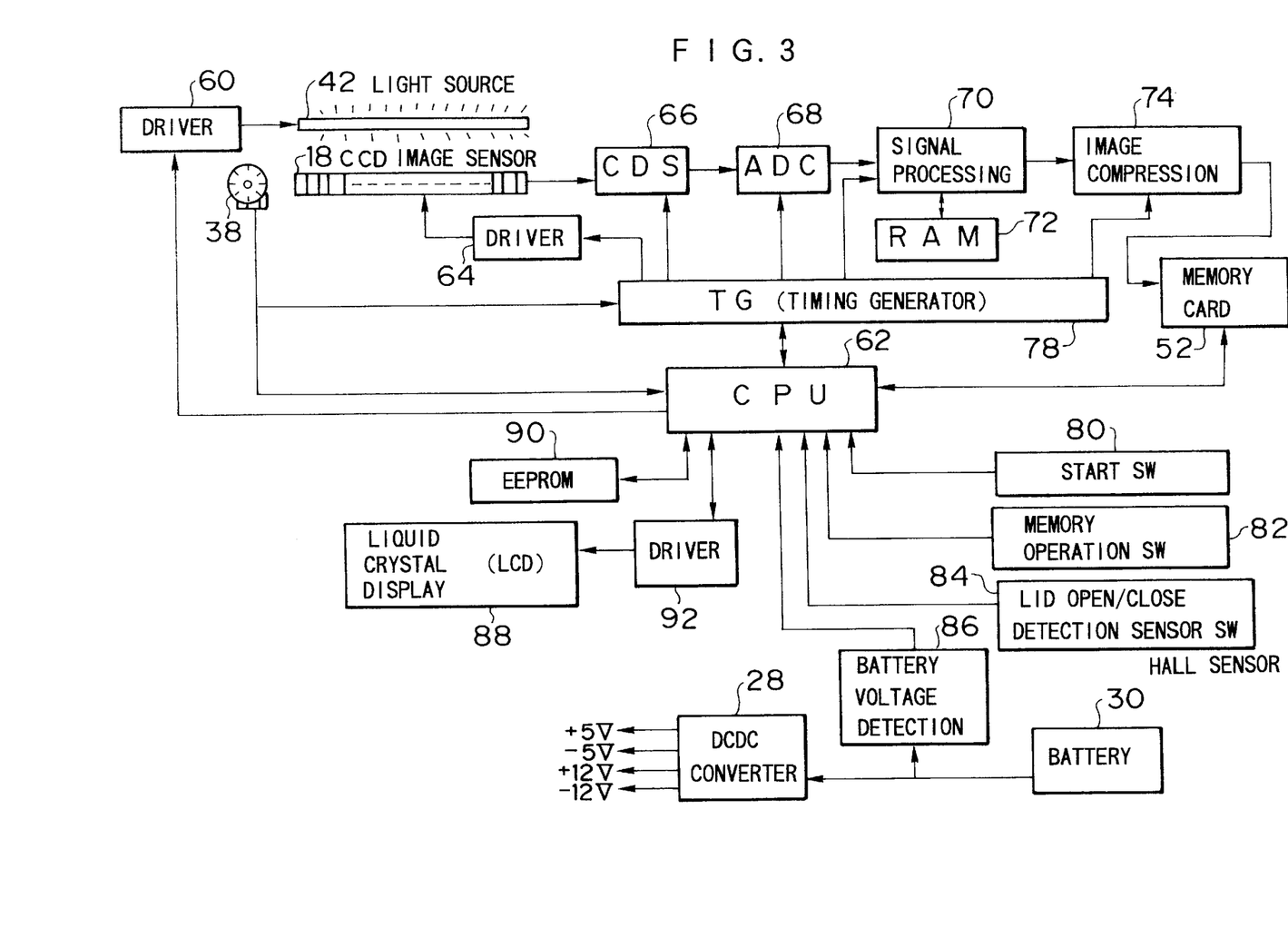
FIG. 3 is a block diagram which shows the structure of the scanner system.

FIG. 3 is a block diagram to show the structure of the scanner system.

The light source 42, illuminating the script 32 surface, consists of, for example, a long fluorescent lamp which perpendicularly crosses the running direction of the scanner system 10. The light source 42 turns the light on/off by a light source drive circuit (a driver) 60. The light source drive circuit 60 is controlled by the control signal from a central processing unit (CPU) 62.

The light reflected on the script surface 32 which is illuminated by the light source 42 forms an image on the light receiving surface of the CCD image sensor 18 via the lens 16. The CCD image sensor 18 is provided with the light receiving part for the predetermined number of pixels in the direction to perpendicularly cross the running direction of the scanner system 10. The image light, forming the image on the light receiving surface of the CCD image sensor 18, is accumulated at each light receiving part and then converted to the signal charge of the amount according to the intensity of the light.

The signal charge, accumulated as described above, is sequentially outputted as the voltage signal corresponding to the signal from the CCD drive circuit 64, and added to an A/D converter 68 through the correlation double sampling by the CDS circuit 66.

After the voltage signal is converted to the digital signal by the A/D converter 68, a signal processing circuit 70 performs necessary process on the voltage signal, and then the voltage signal is stored in random access memory (RAM) 72. RAM 72 is comprised of SRAM or DRAM. The color output signal is produced by spatial position correction and by time synchronization process, based on the data which is recorded in RAM 72. In addition, after the image signal has gone through the signal processing circuit 70 and the data is compressed by an image compressing circuit 74, the image signal is recorded and stored in the memory card 52.

The rotation detection sensor 38 outputs pulse signals, indicating the number of rotations of the main roller 36, to a timing generator 78 and the CPU 62. The timing generator 78 generates the pulse signals which is synchronized with the rotation of the main roller 36 corresponding to the pulse signal to input. The pulse signal, generated from the timing generator 78, is added to the CCD drive circuit 64, CDS circuit 66, A/D converter 68, signal processing circuit 70, image compressing circuit 74, and so on, and each circuit is synchronized.

Each condition of a start switch 80 to instruct the scanner system to start scanning, a memory operation switch 82, a Hall sensor, or a lid open/close detection sensor switch 84 which is the same as the reed switch 50, is inputted to the CPU 62. The CPU 62 controls the light source drive circuit 60 and the timing generator 78 according to the Condition of each switch.

The battery 30 as the power source is connected with a battery voltage detector means 86, and notifies the voltage condition of the battery to the CPU 62. In the CPU 62, the residue of the battery can be determined based on the signal from the battery voltage detector means 86.

The battery 30 is connected with the DC—DC converter 28, and the constant voltage at +5V, −5V, +12V, −12V is produced by the DC—DC converter 28. The constant voltage is supplied to each circuit.

EEPROM 90 is connected to the CPU 62, and number of taking, correction data, A/D convert offset level, inverse correction (shading data) of the output voltage of CCD, and so on, are recorded in EEPROM 90. Moreover, a liquid crystal display (LCD) 88 is provided to the scanner system 10, so that the conditions of each switch, battery residue, condition of memory using, and so on, can be displayed. In addition, an LCD driver 92 is controlled by the CPU 62.

Figure 4:
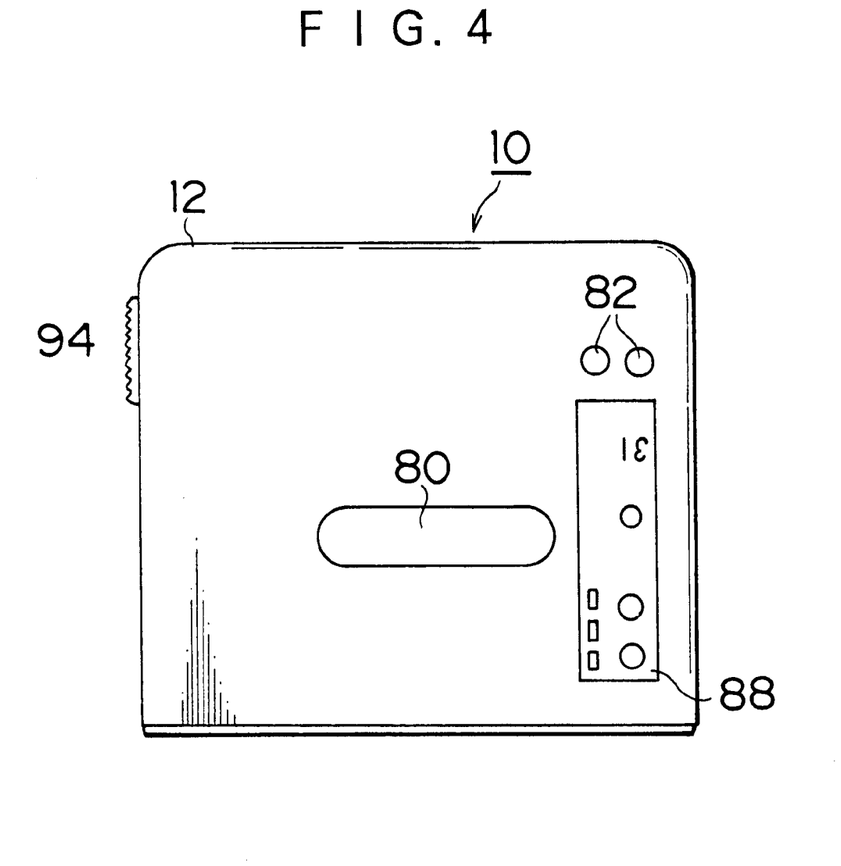
FIG. 4 is a front view which shows the outward appearance of the scanner system in the unoperated state.
Figure 5:
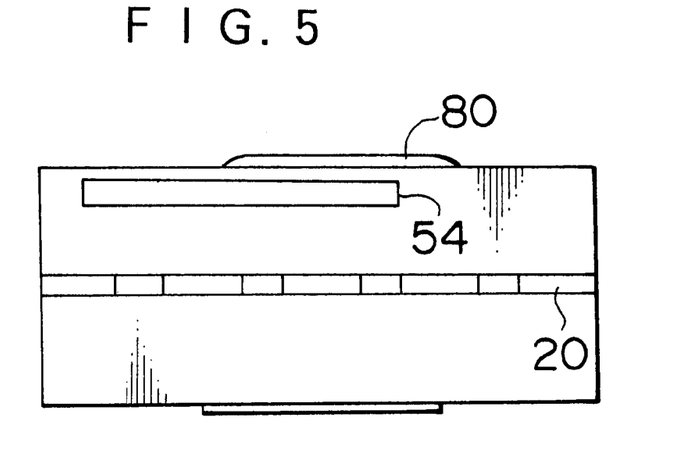
FIG. 5 is a bottom plane view which shows the outward appearance of the scanner system in the unoperated state.
Figure 6:
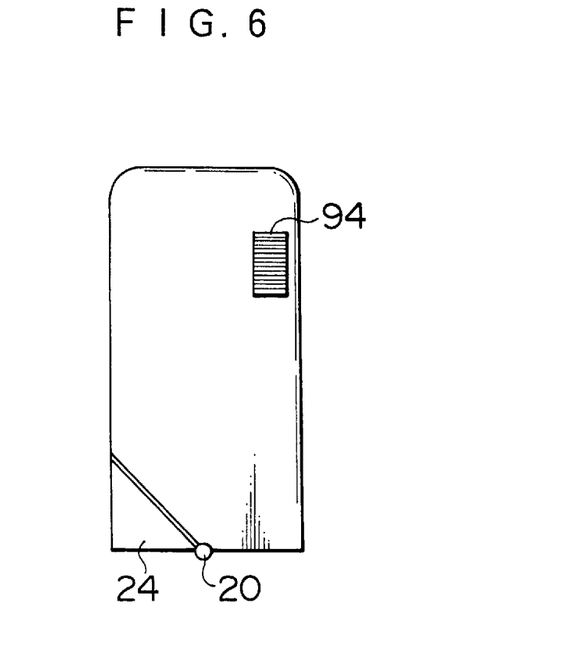
FIG. 6 is a left side view which shows the outward appearance of the scanner system in the unoperated state.
Figure 7:
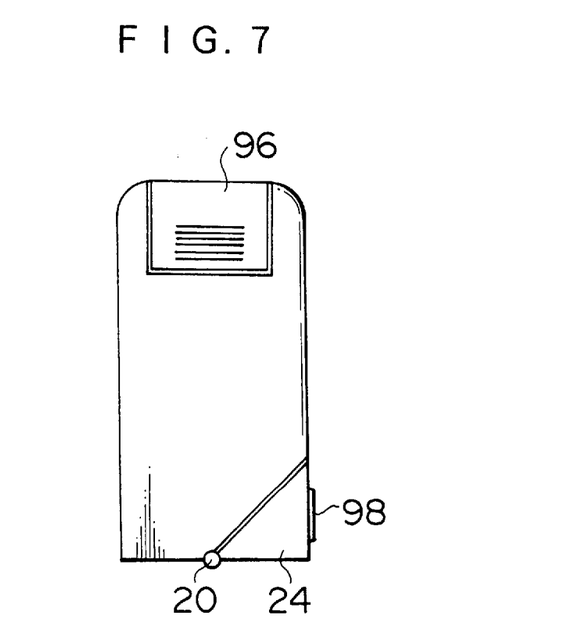
FIG. 7 is a right side view which shows the outward appearance of the scanner system in the unoperated state.
Figure 8:
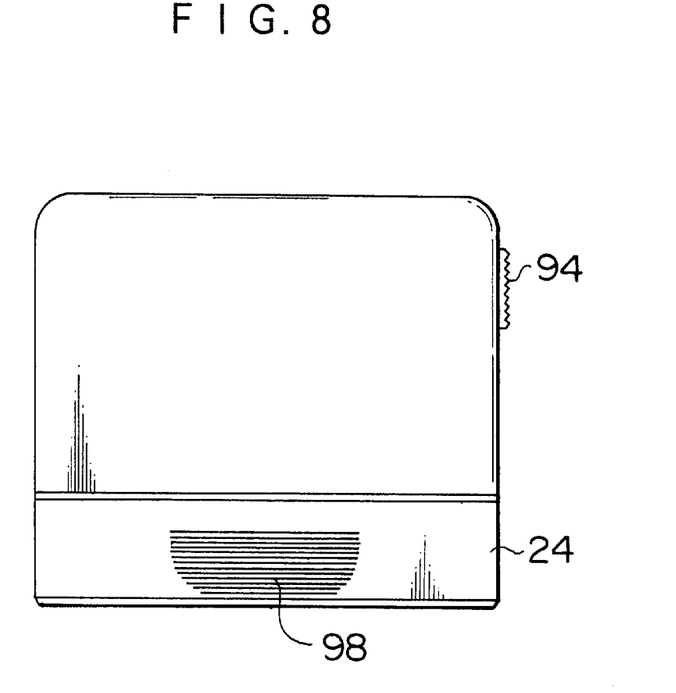
FIG. 8 is a rear view which shows the outward appearance of the scanner system in the unoperated state.

FIGS. 4 to 8 are views to show the outer appearance of the scanner system in the unoperated state: FIG. 4 is a front view, FIG. 5 is a bottom view, FIG. 6 is a left side view, FIG. 7 is a right side view, and FIG. 8 is a rear view.

As shown in FIG. 4, the start switch 80 is provided at the center of the front part of the main body, and the liquid crystal display (LCD) 88 in rectangular shape is provided at the right of the start switch 80. When scanning the script image, the scanner system 10 is moved over the script 32 surface while pressing the start switch 80 or after pressing the start switch 80 once. The number of scanned images, the setting conditions of the memory and each parameter, or scanning condition, and so forth, are displayed on the LCD 88.

The reference numeral 82 in FIG. 4 is a memory operating button which instructs storing the scanned image data to the memory card 52 and deleting the stored data, and so on.

A card memory eject switch 94 is provided at the left of the main body casing 12 (see FIG. 6). When the eject switch 94 is operated to the bottom, the memory card 52 is ejected from the card insertion entrance 54 at the bottom of the scanner system 10.

Figure 9:
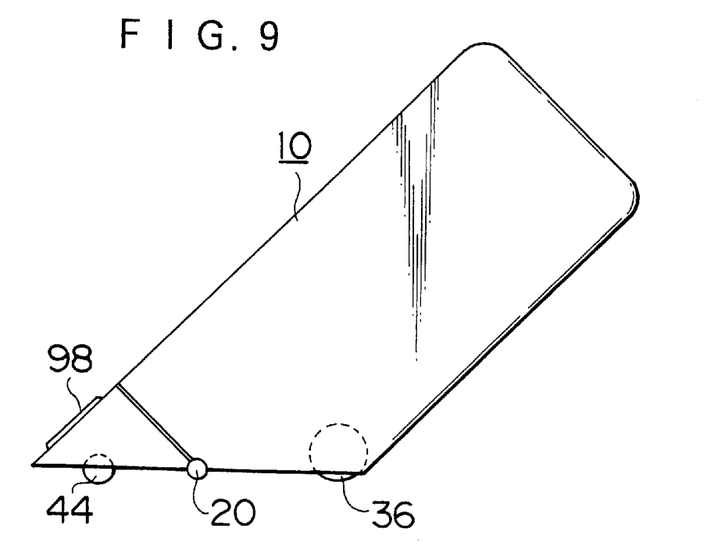
FIG. 9 is a side view of the outward appearance which shows the scanner system in an operating state.

As shown in FIG. 7, a battery lid 96 is provided to be freely opened and closed at the top of the right surface of the scanner system, so that the battery 30 can be exchanged by opening the battery lid 96. Moreover, as shown in FIG. 8, a knob 98 to open and close the light source unit is formed at the rear bottom of the scanner system 10. As the knob 98 is pushed down so as to turn the light source unit 24, the scanning face is opened as shown in FIG. 9, and the scanner is in a usable condition by tilting the main body of the scanner by 45°.

Next, an explanation will be given of the operation of the scanner system which is constructed as described above.

When the light source unit 24 is opened by operating the knob 98 to open and close the light source unit from the state in FIG. 2, and the Hall sensor or a reed switch 50 detects the opening state of the light source unit 24, the main switch turns on.

Then as shown in FIG. 1, the main body is tilted by 45° so that the scanning face turns toward the script 32, and the main body is set to the scanning position. The start switch 80 is pressed to start scanning of the script 32.

When the main body is moved in a determined direction (right in FIG. 1) over the script 32 surface while pressing the start switch 80, the main roller 36 and the assist roller 44 rotate while contacting the script 32. The distance between the scanner system 10 and the script 32 surface is maintained to be constant; thus the scanner system 10 moves smoothly.

The two-dimensional image information can be obtained by conducting the light reflected on the script 32 surface to the CCD image sensor 18 via the prism block 14 and the lens 16 while detecting the moving distance of the scanner system 10 by the rotation detection sensor 38 based on the rotation of the main roller 36.

After the scanner system is moved over the scanning range, the start switch 80 is turned off to finish image scanning. Then, the scanned image data is stored in the memory card 52 by operating the memory operating button 82.

When the scanner is not being used, the light source unit 24 is rotated counterclockwise in FIG. 1, then contained in the right bottom part of the main body casing 12 as shown in FIG. 2, and the scanning face is closed. Therefore, taking on/off a protection cover that has been a problem in conventional devices is eliminated, and a scanning face can avoid dusts and scratches. Moreover, the main roller 36 and the assist roller 44 can also avoid dusts and foreign materials, thus improper sliding or operation of the roller during scanning can be prevented.

Further, the light source unit 24 is contained in the right bottom of the main body casing 12 and the whole body becomes rectangular shape; thus the scanner system can be put in a pocket of clothing, and is handy to carry as well.

In addition, the optical system, utilizing the prism block 14, is described as an example in the above-described embodiment, but the present invention is not limited to that; for example, an optical mirror can also be incorporated.

In the above-described embodiment, a case in which the light source 42 and the assist roller 44 are arranged on the lid is described as an example, though the members, arrangements on the lid, etc. have various combinations. For example, a projection (not shown), contacting and sliding on the script 32 surface, can be formed instead of the assist roller 44. Moreover, the assist roller 44 discussed as being is arranged to the main body 12 side. and Instead, the main roller 36 can be arranged on the lid. In short, it is acceptable as long as the lid is provided with one of the light source 42, assist roller 44, the projection, or main roller 36; the combination is not specifically limiting.

As described above, according to the scanner system related to the present invention, the scanning face, on which the scanning window is formed to take the light reflected on the script surface, is adapted to be covered and uncovered by the lid. Further, at least one of the light source for illumination, the roller, and the projection, is arranged on the lid. Therefore, a problem of removing on and off the protection cover can be eliminated. Additionally, the scanning window can avoid dusts and scratches, and at the same time the whole body can be compact and becomes handy to carry.

The scanner system can easily run by constructing the shape of the side of the lid to be substantially a right triangle, and making the diagonal part of the lid face the script surface, and at the same time constructing the whole scanner system for use by tilting it. Thus the operation of the scanner system is improved. In addition, there is an advantage in that the whole shape of the scanner system when the lid is closed can be substantially rectangular.

Moreover, the part which is able to rotate can be held to be opening/closing state with a simple structure by utilizing a magnet for lock holding in the closing/opening state of the lid. Further, there is an advantage in that the operation of the scanner system is improved by detecting whether the lid is in the opening state or closing state using the magnetic detection sensor, and turning on/off the main power switch in response to the state.

Furthermore, the insertion entrance of the memory card is forcibly closed in a case that the lid is in the open-locked state. The insertion/pulling-out the memory card is possible only when the lid is in the close-locked state or the scanner system is in the unoperated state with the power source being off. Therefore, there is an advantage in that an erroneous operation such as pulling out the memory card by mistake during operation of the scanner system can be prevented.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A scanner, movable over a script surface while illuminating the script surface with a light source, for scanning image information of the script surface from light reflected from the script surface to an image sensor, comprising:

a scanning face in which a scanning window is formed, through which the light reflected from the script is transmitted, adapted to be covered and uncovered by a lid hinged to a main body of the scanner, wherein the scanning window is located in the main body of the scanner; and the light source for illumination being arranged in said lid.

2. The scanner as set forth in claim 1, wherein the lid is substantially a triangle.

3. The scanner as set forth in claim 1, further comprising:

a first magnet used to lock said lid in a closing state, covering the scanning face, when the scanner system is not being operated;

a second magnet is used to lock said lid in an opening state, uncovering the scanning, face during scanning of the image information of the script; and a magnetic detection sensor, detecting a locking state from at least one of said first and second magnets.

4. The scanner as set forth in claim 3, wherein a main power source is turned on upon said magnetic detection sensor detecting that said lid is locked in the open state.

5. A scanner, movable over a script surface while illuminating the script surface with a light source, for scanning image information of the script surface from light reflected form the script surface to an image sensor, comprising:

a scanning face in which a scanning window is formed, through which the light reflected from the script is transmitted, adapted to be covered and uncovered by a lid hinged to a main body of the scanner; and at least one of the light source for illumination, a roller contacting and rotating on the script surface, and a projection contacting and sliding on the script surface, being arranged in the lid, wherein a memory card is arranged so that an entrance in the main body, for insertion of said memory card which stores the image information, is closed when said lid is in an open-locked state, and so that said memory card is able to be inserted and removed only when said lid is in a close-locked state or when the scanner system is not being operated with a power source being off.

6. The scanner as set forth in claim 5, further comprising:

a first magnet used to lock said lid in the close-locked state, covering the scanning face, when the scanner is not being operated;

a second magnet used to lock said lid in the open-locked state, uncovering the scanning face, during scanning of the image information of the script; and a magnetic detection sensor, detecting a locking state from at least one of said first and second magnets.

7. The scanner as set forth in claim 6, wherein a main power source is turned on upon said magnetic detection sensor detecting that said lid is locked in the open-locked state.

8. A scanner, comprising:

a scanning window, located in a main body of the scanner, through which reflected light is received to perform a scanning operation; and a lid, hinged to the main body of the scanner, for protecting said scanning window when closed and movable away from the scanning window when open, wherein an insertion entrance, for a memory card used for storing scanned information, is closed when the lid is open and open when the lid is closed so that the memory card is removable from the insertion entrance only when the lid is closed.

9. The scanner of claim 8, wherein the scanner is a hand-held scanner.

10. The scanner of claim 8, further comprising:

a light source for illuminating light toward a surface to be scanned; and at least one roller for rotating on the surface to be scanned.

11. The scanner of claim 10, wherein at least one of said roller and said light source is arranged in said lid.

12. The scanner of claim 11, wherein one roller is arranged in the lid and another roller is arranged in the main body of the scanner.

13. The scanner of claim 8, wherein the lid is substantially triangular.

14. The scanner of claim 13, wherein the lid is substantially a right triangle.

15. The scanner of claim 8, wherein the scanner is substantially rectangular when the lid is closed.

16. The scanner of claim 8, further comprising:

a sensor, adapted to receive the light reflected through the scanning window and capture an image.

17. A scanner, comprising:

a light source adapted to illuminate light toward a surface to be scanned;

a scanning window, located in a main body of the scanner, through which light reflected from the surface is received; and a cover, hinged to the main body of the scanner, covering and protecting said scanning window when in a first closed position and movable to a second open position, wherein the light source is arranged in the cover and is adapted to illuminate light through an opening in the cover when the cover is open.

18. The scanner of claim 17, wherein the scanner is a hand-held scanner.

19. The scanner of claim 17, further comprising:

at least one roller for rotating on the surface to be scanned.

20. The scanner of claim 19, wherein one roller is arranged in the cover and another roller is arranged in the main body of the scanner.

21. The scanner of claim 17, wherein the cover is substantially triangular.

22. The scanner of claim 21, wherein the cover is substantially a right triangle.

23. The scanner of claim 17, wherein the scanner is substantially rectangular when the cover is closed.

24. The scanner of claim 17, further comprising:

a sensor, adapted to receive the light reflected through the window and capture an image.

25. The scanner as set forth in claim 8, further comprising:

a first magnet used to lock said lid in a closing state, covering the scanning window, when the scanner is not being operated;

a second magnet used to lock said lid in an opening state, uncovering the scanning window, during the scanning operation; and a magnetic detection sensor, detecting a locking state from at least one of said first and second magnets.

26. The scanner as set forth in claim 25, wherein a main power source is turned on upon said magnetic detection sensor detecting that said lid is locked in the opening state.

27. The scanner as set forth in claim 17, further comprising:

a first magnet used to lock said cover in the first closed position, covering the scanning window, when the scanner is not being operated;

a second magnet used to lock said cover in the second open position, uncovering the scanning window, during scanning; and a magnetic detection sensor, detecting a locking state from at least one of said first and second magnets.

28. The scanner as set forth in claim 27, wherein a main power source is turned on upon said magnetic detection sensor detecting that said lid is locked in the first open position.

29. A scanner comprising:

at least one of a roller for rotating on a surface to be scanned and a projection for contacting and sliding on the surface;

a scanning window, located in a main body of the scanner, through which light reflected from the surface is received; and a cover, hinged to the main body of the scanner, covering and protecting said scanning window when in a first closed position and movable to a second open position, wherein said at least one of the roller and the projection is arranged in the cover and is adapted to contact the surface to be scanned when the cover is open.

30. The scanner of claim 29, furthr comprising a light source for illuminating light toward the surface to be scanned.

31. The scanner of claim 29, wherein the scanner is a hand-held scanner.

32. The scanner of claim 29, wherein the cover is substantially triangular.

33. The scanner of claim 32, wherein the cover is substantially a right triangle.

34. The scanner of claim 29, wherein the scanner is substantially rectangular when the cover is closed.

35. The scanner of claim 29, further comprising:

a sensor, adapted to receive the light reflected through the scanning window and capture an image.

36. The scanner of claim 29, further comprising:

a first magnet used to lock said cover in the first closed position, covering the scanning window, when the scanner is not being operated;

a second magnet used to lock said cover in the second open position, uncovering the scanning window, during scanning; and a magnetic detection sensor, detecting a locking state from at least one of said first and second magnets.

* * * * *

UNITED STATES PATENT AND TRADEMARK OFFICE
CERTIFICATE OF CORRECTION

PATENT NO. : 6,081,630
DATED : June 27, 2000
INVENTOR(S) : Koji KANEKO

It is certified that error appears in the above-identified patent and that said Letters Patent is hereby corrected as shown below:

On the title page, item:

[73] Assignee, please change the assignee's name from "Fuji Photo Co., Ltd." to -- Fuji Photo Optical Co., Ltd. --

Signed and Sealed this

Eighth Day of May, 2001

Attest:

NICHOLAS P. GODICI

Attesting Officer

Acting Director of the United States Patent and Trademark Office